Oct. 28, 1969     J. F. HELDERMAN     3,474,700
MEANS FOR MOUNTING A RIGID OBJECT AT THE TIP
END OF A STUD ELEMENT
Filed May 9, 1968
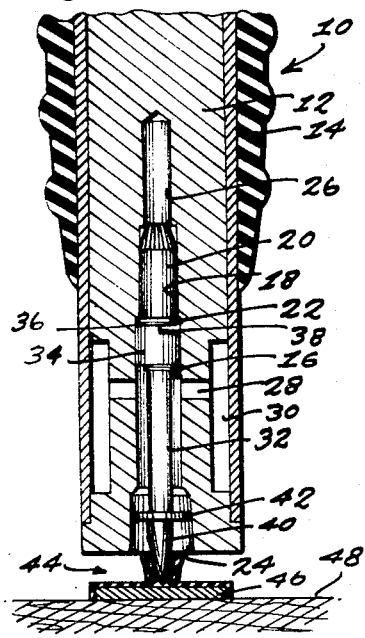
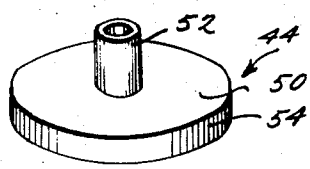
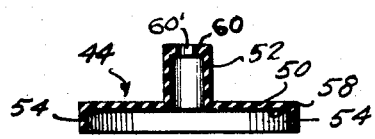
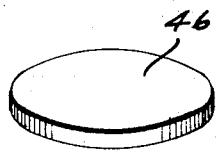
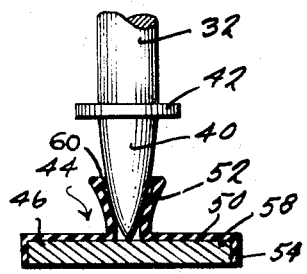
INVENTOR
JAMES F. HELDERMAN
BY Channing P. Richards &
     Delbert L. Shefte
     ATTORNEYS

United States Patent Office 3,474,700
Patented Oct. 28, 1969

3,474,700
MEANS FOR MOUNTING A RIGID OBJECT AT THE TIP END OF A STUD ELEMENT
James F. Helderman, York, Pa., assignor to U.S. Expansion Bolt Company, York, Pa., a corporation of Pennsylvania
Filed May 9, 1968, Ser. No. 727,989
Int. Cl. F16b 15/00
U.S. Cl. 85—10
10 Claims

ABSTRACT OF THE DISCLOSURE

A carrier member for mounting a flat rigid object such as a disc or washer at the tip end of a stud element used with an explosive actuated tool to position the object so that the stud element will be driven therethrough when the tool is actuated. The carrier member is composed of deformable material and includes a flat circular base portion, an annular flange projecting from the periphery of the circular base portion coaxially therewith for frictionally holding a rigid disc-shaped object thereat, and a generally tubular sleeve portion extending from the flat circular base portion oppositely and coaxially with respect to the annular flange for receiving the pointed tip end of the stud element in frictional engagement therewith to retain the carrier member thereon prior to actuation of the tool.

BACKGROUND OF THE INVENTION

In tools used to drive fasteners such as stud elements into a work surface, it is often desirable to locate a rigid object in the path of the stud element as it is driven by the tool, the particular form and purpose of the rigid object depending generally on the type of tool being employed.

For example, in U.S. Patent No. 2,575,079, issued November 13, 1951, a stud driving tool is disclosed in which a rigid washer element is held by a special construction at the muzzle of the tool which locates the washer element in the path of the stud element so that it will pass through the central opening in the washer element and carry it along therewith as it is driven into the work surface, the washer element thereby serving to increase the effective diameter of the head of the stud element and prevent penetration of this head into the work surface.

Also, it is particularly desirable, and often necessary, to locate a rigid object in the path of explosive actuated stud driving tools of the type described and claimed in U.S. Patent No. 3,172,123 in which the tip end of the stud element to be driven is forced against the work surface to cause inward movement of the stud element for impact ignition with an explosive charge positioned in the tool bore inwardly of the stud element whereupon the resulting explosion drives the stud element from the tool and into the work surface. Since the tip end of the stud element has a pointed configuration to facilitate ultimate driving of the stud element into the work surface, it has a tendency to penetrate the work surface against which it is forced, and if the superficial rigidity of this surface is such that it will allow a substantial penetration thereof, then the stud element will not be caused to move inwardly to provide the impact ignition of the explosive charge and the tool will not fire. Consequently, when the work surface is a soft wood or similar material, it has been necessary heretofore to provide the tool with an arrangement for impelling the extending tip end of the stud element against a rigid metal disc supported by the muzzle end of the tool and in the path of the stud element, all as described in greater detail in the aforementioned U.S. Patent No. 3,172,123.

By the present invention, a rigid object such as a washer element or a solid disc may be mounted directly onto the stud element itself, thereby eliminating the need for any special tool construction for holding an object in the path of the stud element as it is driven.

SUMMARY OF THE INVENTION

The present invention provides a carrier member for supporting a rigid object such as a washer element or metal disc directly on the tip end of the stud element, the rigid object being disposed in transverse relation to the longitudinal axis of the stud element when the tool is positioned for driving the stud element in the work surface whereby the rigid object will be interposed between the work surface and the tip end of the stud element, and in the path of the stud element as it is driven by the tool.

In the disclosed embodiment of the present invention, the carrier member includes a base portion from which a stud element engaging portion extends for surrounding frictional engagement with the tip end of the stud element, and from which an object holding portion extends oppositely with respect to the stud element engaging portion so as to hold a rigid object in the path of the stud element as it is driven. Preferably, the entire carrier member is composed of a resilient material with the base portion consisting of a flat circular wall from the periphery of which an annular flange extends in generally perpendicular relation thereto to form the object holding portion, and from which the stud element engaging portion extends in the form of a generally tubular sleeve extending oppositely and coaxially with respect to the annular flange for receiving the tip end of the stud element in frictional engagement therewith.

By virtue of this carrier member, a washer element can be held in the path of the stud element with the central opening of the guide washer disposed in alignment with the longitudinal axis of the stud element to assure passage thereof through the central opening as the stud element is driven. Moreover, in explosive actuated tools of the type described in the aforementioned U.S. Patent No. 3,172,123, a rigid metal disc can be readily disposed at the tip end of the stud element and then positioned flush against a relatively soft work surface to provide a rigid surface against which the stud element tip end can be forced to cause inward movement thereof which results in ignition of the explosive charge to drive the stud element, the relatively powerful force applied to the stud element by the expanding gases of the ignited charge being sufficient to drive the stud element through the metal disc and into the work surface until the enlarged head portion of the stud element bottoms against the metal disc and holds it against the work surface in washer-like fashion.

BRIEF DESCRIPTION OF THE DRAWINGS

FIG. 1 is a vertical sectional view taken through an explosive actuated tool having a metal disc mounted at the tip end of the stud element by a carrier member embodying the present invention;

FIG. 2 is a perspective view of the carrier member illustrated in FIG. 1;

FIG. 3 is a vertical sectional view of the carrier member illustrated in FIG. 2;

FIG. 4 is a perspective view of a rigid disc to be carried by the carrier member shown in FIG. 2; and FIG. 5 is an enlarged detail view, partially sectional, illustrating the carrier member mounted on the tip end of a stud element and holding the rigid disc thereat.

DESCRIPTION OF THE PREFERRED EMBODIMENT

Referring now in detail to the accompanying drawings, FIG. 1 illustrates an explosive actuated tool 10 of the type described in the aforementioned U.S. Patent No. 3,172,123 which includes a barrel member 12 having a rubber grip 14 fitted thereon for convenient handling of the tool 10, the barrel member 12 being provided with a central bore 16 formed near its innermost end with a chamber 18 of reduced diameter to receive an explosive charge or cartridge 20 with the ignition rim 22 thereof abutting the shoulder formed by the reduced diameter of the chamber 18. The bore 16 is also formed with an enlarged outermost portion 24, and an explosive chamber 26 located inwardly of the cartridge chamber 18 to permit a portion of the expanding gases generated by the ignition of the cartridge 20 when the tool 10 is actuated to eject the spent cartridge 20 from the cartridge chamber 18, the bore 16 also being connected by ports 28 to an expansion chamber 30 formed in the barrel member 12 to reduce recoil of the tool 10 when it is actuated, all as explained in greater detail in the aforementioned U.S. Patent No. 3,172,123.

The stud element 32 which is to be driven by the tool 10 includes a head portion 34 having a stepped end face 36 presenting a protruding edge 38, and a pointed tip end portion 40. Also, a guide washer 42 is carried on the shank portion of the stud element 32 by a friction fit.

To prepare the tool 10 for firing, the cartridge 20 is inserted in the bore 16 until it is received by the cartridge chamber 18, and the stud element 32 is then inserted in the bore 16 until the protruding edge 38 of the head portion end face 36 abuts the ignition rim 22 of the cartridge 20 as illustrated in FIG. 1, the guide washer 42 being accommodated in the enlarged bore portion 24 to guide the stud element 32 in a true path when it is driven from the bore 16.

Normally, the tool 10 is actuated by holding it with the stud element tip end 40 in contact with a work surface, and by striking the top end face of the barrel member 12 with a hammer or similar implement to cause inward movement of the stud element 32 in the bore 16 whereupon the protruding edge 38 will be forced against the ignition rim 22 so as to ignite the cartridge 20, the expanding gases genertaed by the resulting explosion acting to drive the stud element 32 from the bore 16 and into the work surface. However, as has been mentioned, if the superficial rigidity of the work surface is such that it will allow penetration thereof by the stud element tip end portion 36 when the barrel member 12 is struck, then the stud element 32 will not be caused to move inwardly in the bore 16 and the cartridge 20 will not be ignited. To obviate a situation of this sort from occurring, the present invention provides for a carrier member 44 which can be mounted on the tip end portion 40 of the stud element 32 to interpose a rigid object such as a metal disc 46 between the stud element tip end portion 40 and a soft work surface 48 as illustrated in FIG. 1 whereby the former will have a hard surface against which to react without penetration when the barrel member 12 is struck in the aforementioned manner.

The carrier member 44 is composed of a resilient material, preferably a suitable grade of polyvinyl chloride, and includes a base portion in the form of a flat circular wall 50 having a central opening therein, a stud element engaging portion in the form of a generally tubular sleeve 52 that extends perpendicularly from the circular wall 50 about the central opening therein, and an object holding portion in the form of an annular flange 54 projecting from the periphery of the circular wall 50 in perpendicular relation thereto so that it extends oppositely and coaxially with respect to the tubular sleeve 52.

The metal disc 46 which is to be carried by the carrier member 44 is illustrated in FIG. 4, and it has a circular shape with a diameter and thickness corresponding substantially to the inner diameter and depending extent of the annular flange 54, respectively, so that when it is placed in the carrier member 44 it will seat against the bottom surface 58 presented by the circular wall 50 and be held thereat by frictional engagement of the annular flange 54. The metal disc 46 must have a material composition which will provide sufficient superficial surface rigidity to stop the initial thrust of the stud element tip end portion 40 when the barrel member 12 is struck, yet which has sufficient perviousness to permit ultimate penetration thereof by the stud element 32 when the cartridge 20 is ignited. A suitable material composition which will provide these characteristics for the metal disc 46 is a 14 gauge mild steel disc having a thickness of .0737" and provided with a zinc plating having a thickness of from .0002" to .0003".

Since the carrier member 44 will be mounted on stud elements having a wide variety of tip end configurations and tip end radii, the extending end of the tubular sleeve 52 is preferably formed with an inwardly turned flange 60 which provides an opening 60' of reduced radius for frictionally engaging stud elements having extremely small point radii. In addition, because of the resilient nature of the material from which the carrier member 44 is formed, the inwardly turned flange 60 will yield readily to permit reception of the stud elements having large point radii as illustrated in FIG. 5, and will also increase the frictional purchase on such stud elements.

To use the carrier member 44, the metal disc 46 is placed therein for frictional engagement by the annular flange 54, and the tubular sleeve is then moved onto the tip end portion 40 of the stud element 32 until the point thereof is positioned adjacent the metal disc 46, the metal disc 46 then being held by the carrier member 44 in the path of the stud element 32 and in substantially perpendicular relation to the longitudinal axis thereof. The tool 10 is then held with the metal disc 56 disposed flush against the work surface 48 as illustrated in FIG. 1, and the barrel member 12 is struck with a hammer as has been previously described. The force of this hammer blow will not cause penetration of the metal disc 46 by the stud element tip end portion 40, and the stud element 32 will move inwardly in the bore 16 to ignite the cartridge 20 whereupon the stud element 32 will be driven from the bore 16, through the metal disc 46 and into the work surface 48. As the stud element 32 is thus driven, the carrier member 44 will deform and ultimately be destroyed by the passage of the stud element 32 therethrough, and the metal disc 56 will be held against the work surface 48 in washer-like fashion by the head portion 34 and guide washer 42 of the stud element 32 which, because they are enlarged, will not pass through metal disc 46.

It is to be noted that while the disclosed carrier member 44 embodying the present invention has been described in relation to an explosive actuated tool requiring the use of a solid metal disc, the same carrier member 44 could be utilized to carry a similar object at the end of a stud element to be driven by other types of stud driving tools as, for example, to carry a washer element at the end of a stud element driven by a tool which did not utilize inward movement of the stud element to actuate the tool; and, therefore, the present invention is not limited to the particular application of the carrier member 44 which has been described above.

I claim:

1. A carrier member and object carried thereby for mounting beyond the pointed tip end of a stud element that is to be driven from an explosive actuated tool into a work surface, said object being solid and being composed of a material which will resist ultimate penetration of said stud element tip end until a substantial driving force is applied thereto upon actuation of said tool, and said carrier member comprising a base portion, a stud element enaging portion extending from said base portion and formed for engagement with said stud element tip end, and an object holding portion extending from said base portion oppositely with respect to said stud element engaging portion and formed to hold said solid object thereat, said object holding portion being arranged to dispose said solid object held thereby longitudinally beyond the pointed tip end of said stud element whereby said solid object will be interposed between said pointed tip end and the work surface into which said stud element is driven upon actuation of said tool.

2. A carrier member as defined in claim 1 and further characterized in that said stud element engaging portion is composed of resilient material for frictionally engaging said stud element tip end, and in that said solid object is a flat disc composed of 14 gauge mild steel having a thickness of .0737" and provided with a zinc plating having a thickness of from .0002" to .0003".

3. A carrier member as defined in claim 1 and further characterized in that said stud element engaging portion is a generally tubular sleeve for receiving said stud element tip end for frictional engagement therewith.

4. A carrier member as defined in claim 3 and further characterized in that said tubular sleeve is formed at the extending end thereof with an inwardly turned flange to provide an opening of reduced radius thereat.

5. A carrier member as defined in claim 1 and further characterized in that said object holding portion is a resilient flange projecting from said body portion oppositely with respect to said stud element engaging portion.

6. A carrier member as defined in claim 5 and further characterized in that said projecting resilient flange has an annular extent and is disposed coaxially with respect to the longitudinal axis of said stud element when the latter is engaged by said stud element engaging portion.

7. A carrier member as defined in claim 1 and further characterized in that said body portion presents a flat surface adjacent said object holding portion for seating thereagainst a flat object as it is held by said object holding portion.

8. A carrier member as defined in claim 5 and further characterized in that said surface is presented at one side of a flat circular wall, and in that said object holding portion is a resilient annular flange projecting from the periphery of said circular wall in generally perpendicular relation thereto.

9. A carrier member as defined in claim 8 and further characterized in that said circular wall is disposed in substantially perpendicular relation to the longitudinal axis of said stud element when the latter is engaged by said stud element engaging portion for holding said flat object flush against said work surface and in the path of said stud element when said tool is actuated.

10. A carrier member as defined in claim 9 and further characterized in that said stud element engaging portion comprises a generally tubular sleeve composed of resilient material and extending from said circular wall oppositely and coaxially with respect to said resilient annular flange.

References Cited

UNITED STATES PATENTS

| | | |
|---|---|---|
| 3,289,522 | 12/1966 | Bell. |
| 3,320,845 | 5/1967 | Eschweiler. |
| 3,382,751 | 5/1968 | Kopf. |

FOREIGN PATENTS

| | | |
|---|---|---|
| 1,313,370 | 11/1962 | France. |
| 1,410,506 | 8/1965 | France. |
| 1,453,611 | 8/1966 | France. |

MARION PARSONS, JR., Primary Examiner

PO-1050
(5/69)

UNITED STATES PATENT OFFICE
CERTIFICATE OF CORRECTION

Patent No. 3,474,700     Dated October 28, 1969

Inventor(s) James F. Helderman

It is certified that error appears in the above-identified patent and that said Letters Patent are hereby corrected as shown below:

Column 6, line 3, "5" should read -- 7 --.

SIGNED AND
SEALED
FEB 24 1970

(SEAL)
Attest:

Edward M. Fletcher, Jr.
Attesting Officer

WILLIAM E. SCHUYLER, JR.
Commissioner of Patents